United States Patent
Hwang et al.

(10) Patent No.: US 9,024,531 B2
(45) Date of Patent: May 5, 2015

(54) APPARATUS FOR DRIVING LIGHT EMITTING DIODE

(71) Applicant: Samsung Electro-Mechanics Co., Ltd., Suwon, Gyunggi-do (KR)

(72) Inventors: Jong Tae Hwang, Gyunggi-do (KR); Deuk Hee Park, Gyunggi-do (KR); Jae Shin Lee, Gyunggi-do (KR); Yun Joong Lee, Gyunggi-do (KR); Sang Hyun Cha, Gyunggi-do (KR)

(73) Assignee: Samsung Electro-Mechanics Co., Ltd., Suwon, Gyeunggi-Do (KR)

( * ) Notice: Subject to any disclaimer, the term of this patent is extended or adjusted under 35 U.S.C. 154(b) by 239 days.

(21) Appl. No.: 13/828,131

(22) Filed: Mar. 14, 2013

(65) Prior Publication Data

US 2014/0091717 A1  Apr. 3, 2014

(30) Foreign Application Priority Data

Sep. 28, 2012 (KR) ......... 10-2012-0108741

(51) Int. Cl.
*H05B 33/08* (2006.01)

(52) U.S. Cl.
CPC ........ *H05B 33/0806* (2013.01); *H05B 33/0827* (2013.01)

(58) Field of Classification Search
CPC .................................................. H05B 33/0806
USPC .......................................................... 315/161
See application file for complete search history.

(56) References Cited

U.S. PATENT DOCUMENTS

| | | | | |
|---|---|---|---|---|
| 7,081,722 | B1* | 7/2006 | Huynh et al. | 315/323 |
| 2010/0072902 | A1* | 3/2010 | Wendt et al. | 315/161 |
| 2010/0231135 | A1* | 9/2010 | Hum et al. | 315/250 |
| 2011/0068693 | A1* | 3/2011 | Hsu | 315/119 |
| 2011/0273103 | A1 | 11/2011 | Hong | |
| 2012/0299490 | A1* | 11/2012 | Lee et al. | 315/191 |
| 2013/0015773 | A1* | 1/2013 | Tai et al. | 315/186 |

FOREIGN PATENT DOCUMENTS

| | | |
|---|---|---|
| JP | 2010-232053 A | 10/2010 |
| KR | 10-0997050 | 11/2010 |

\* cited by examiner

*Primary Examiner* — Douglas W Owens
*Assistant Examiner* — Pedro C Fernandez
(74) *Attorney, Agent, or Firm* — McDermott Will & Emery LLP

(57) ABSTRACT

There is provided an apparatus for driving a light emitting diode (LED), capable of distributing current stress applied to the LED. The apparatus includes an LED part including a plurality of LED units respectively including at least one LED, the plurality of LED units being connected in parallel to a power input terminal to which rectified power in sine wave form is supplied, and, among the plurality of LED units connected in parallel, a termination end of the LED unit in a front end being connected to a middle of an adjacent LED unit; and a current source unit including a plurality of current sources respectively connected to termination ends of the plurality of LED units and allowing corresponding current to flow through the plurality of LED units.

13 Claims, 5 Drawing Sheets

APPARATUS FOR DRIVING LIGHT EMITTING DIODE

CROSS-REFERENCE TO RELATED APPLICATIONS

This application claims the priority of Korean Patent Application No. 10-2012-0108741 filed on Sep. 28, 2012, in the Korean Intellectual Property Office, the disclosure of which is incorporated herein by reference.

BACKGROUND OF THE INVENTION

1. Field of the Invention

The present invention relates to an apparatus for driving a light emitting diode (LED) that distributes current stress applied to the LED.

2. Description of the Related Art

Recently, interest and demand for light emitting diodes (LEDs) has increased.

Devices using LEDs can be manufactured to be compact so that they can be used in situations in which it is difficult to install existing electronic products. In a case in which an LED is used as an illumination device, various colors of light may be implemented in the illumination device, and the intensity of illumination may be controlled, such that LED illumination devices can be used as system illumination devices suitable for use in activities such as watching movies, reading books, conferencing, etc.

Also, LED power consumption is approximately ⅛ that of light bulbs, and a lifespan thereof is 50,000~100,000 hours, approximately 5~10 times that of light bulbs. LEDs are light sources that do not contain mercury, are environmentally-friendly, and are capable of being implemented in various designs.

Owing to such characteristics, many countries such as the United States, Japan, Australia, and others, including Korea, have promoted LED illumination development programs as national enterprises.

In addition, recently, as flat panel display (FPD) technology has been developed, an FPD has been used for a vehicle gauge in addition to having applications in smartphones, game machines, and digital cameras. In the future, the FPD will have a wide range of applications to appliances for everyday use such as ultrathin televisions and transparent navigation systems. In the current display industry, the main market is for FPD products incorporating new technologies reflecting demands stemming from the multimedia era for displays incorporating high resolution and large screens. In particular, in the large display market, sales of liquid crystal display (LCD) televisions have seen rapid growth and thus, LCD TVs are expected to play a leading role in terms of setting future prices and determining marketability.

A thin film transistor liquid crystal display (TFT-LCD) is a main component in FPDs. Such a TFT-LCD includes a backlight unit that emits light and mainly uses a cold cathode fluorescent lamp (CCFL) as a backlight source. However, there has been a recent tendency for the use of LEDs therein owing to various LED characteristics in terms of power consumption, lifespan, and environmental-friendliness. Thus, construction of a low-priced electronic power system of a backlight unit power module using an LED and an appropriate control element thereof are urgently required.

As described above, LEDs, the use of which is increasing, require an apparatus for the driving thereof and an appropriate power source. In a case in which the LED is used by generating direct current (DC) power from alternating current (AC) power, a converter circuit for supplying the DC power is needed, leading to a circuit being complicated. Even in a case in which a simple rectifier is used, an electrolytic capacitor that may reduce the lifespan of the entire system is needed, and a power factor may be problematically reduced.

Accordingly, as disclosed in the related art document below, although a method of driving the LED by directly using power rectified from alternating current power is disclosed, there are defects in that voltage magnitude of the rectified power may vary in the manner of a sine wave, and current stress may be applied excessively to a specific LED according to the varied voltage.

Related Art Document

Korean Patent No. 10-0997050

SUMMARY OF THE INVENTION

An aspect of the present invention provides an apparatus for driving a light emitting diode (LED), capable of distributing current stress applied to the LED by improving connective relationships between LED groups having LED arrays.

According to an aspect of the present invention, there is provided an apparatus for driving a light emitting diode (LED), the apparatus including: an LED part including a plurality of LED units respectively including at least one LED, the plurality of LED units being connected in parallel to a power input terminal to which rectified power in sine wave form is supplied, and, among the plurality of LED units connected in parallel, a termination end of the LED unit in a front end being connected to a middle of an adjacent LED unit; and a current source unit including a plurality of current sources respectively connected to termination ends of the plurality of LED units and allowing corresponding current to flow through the plurality of LED units.

The number of LEDs included in respective LED units among the plurality of LED units may vary.

Among the plurality of LED units, the number of LEDs included in the LED unit in the front end may be smaller than the number of LEDs included in an adjacent LED unit.

Among the plurality of LED units, the number of LEDs included in the LED unit in the front end may be identical to the number of LEDs from an initial end of the adjacent LED unit to a middle of the adjacent LED unit connected to a termination end thereof among all LEDs of the adjacent LED unit.

The plurality of respective current sources may allow current to flow therefrom such that an LED of a corresponding LED unit is conducted.

The current flowing by the plurality of current sources may be distributed by at least a portion of the LEDs of at least two of the plurality of LED units.

According to another aspect of the present invention, there is provided an apparatus for driving an LED, the apparatus including: a power supply unit rectifying and supplying alternating current (AC) power; an LED part including a plurality of LED units receiving the rectified power from the power supply unit and emitting light, each of the plurality of LED units including at least one LED, and, among the plurality of LED units, a termination end of the LED unit in a front end being connected to a middle of an adjacent LED unit; a current source unit including a plurality of current sources respectively connected to termination ends of the plurality of LED units and allowing corresponding current to flow through the plurality of LED units; and a control unit controlling current switching the plurality of current sources of the current source unit according to a voltage level of the rectified power supplied from the power supply unit.

The plurality of LED units may be connected in parallel to power input terminals, respectively, to which the rectified power is supplied from the power supply unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
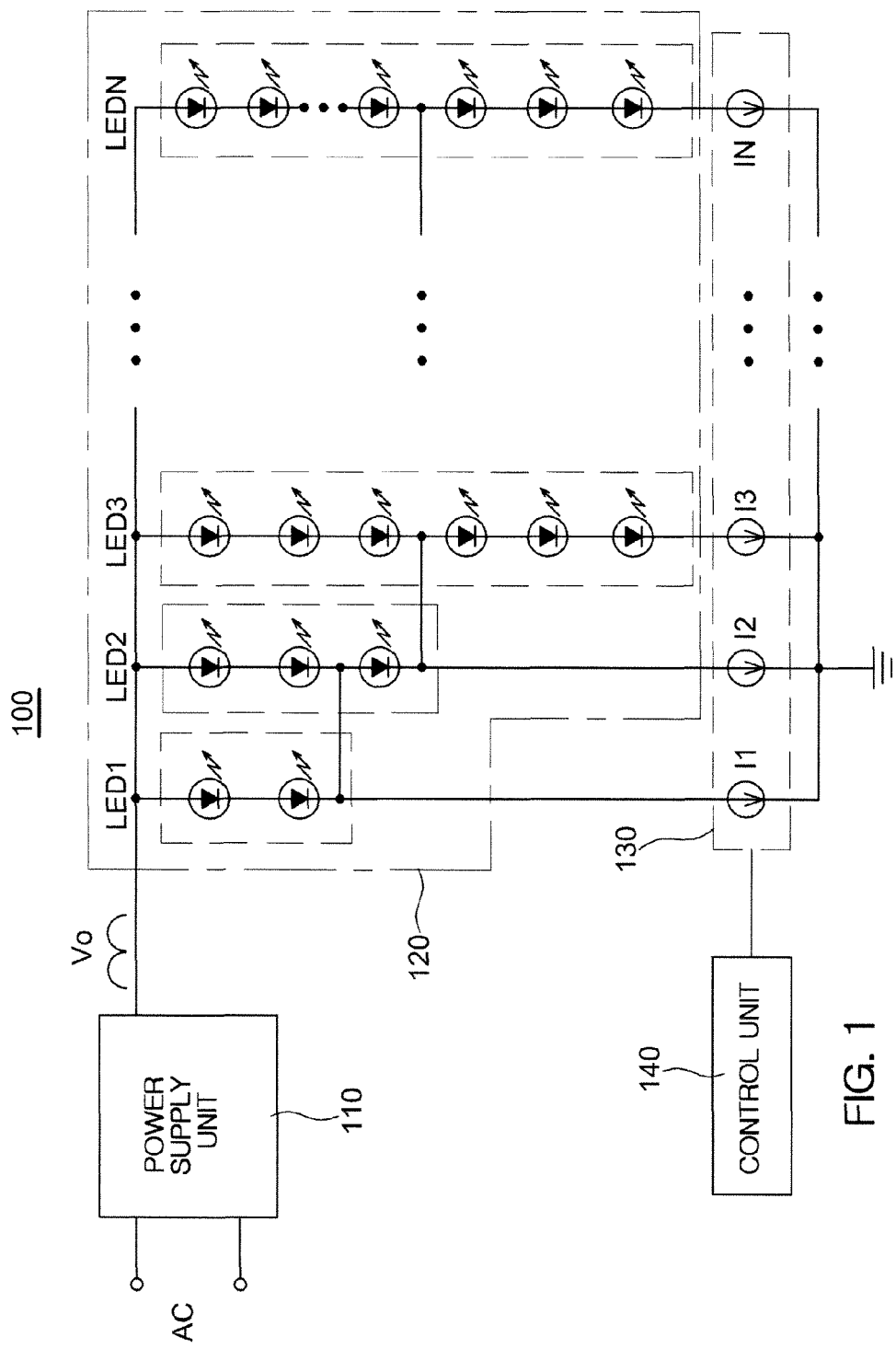
FIG. 1 is a schematic circuit diagram of an apparatus for driving a light emitting diode (LED) according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

A case in which any one part is connected to the other part includes a case in which the parts are directly connected to each other and also includes a case in which the parts are indirectly connected to each other with other elements interposed therebetween.

In addition, unless explicitly described otherwise, "comprising" any components will be understood to imply the inclusion of other components but not the exclusion of any other components.

FIG. 1 is a schematic circuit diagram of an apparatus 100 for driving a light emitting diode (LED) according to an embodiment of the present invention.

Referring to FIG. 1, the apparatus 100 for driving the LED according to an embodiment of the present invention may include a power supply unit 110, an LED part 120, a current source unit 130, and a control unit 140.

The power supply unit 110 may rectify alternating current (AC) power and supply the rectified power in sine wave form. To this end, although not shown, the power supply unit 110 may include a bridge diode, and may further include a passive element such as a resistor for scaling a voltage level of the rectified power or the like.

The LED part 120 may include a plurality of LED units LED1~LEDN. Each of the plurality of LED units LED1~LEDN may include at least one LED.

In this regard, the number of LEDs included in each of the plurality of LED units LED1~LEDN may be different.

Meanwhile, the plurality of LED units LED1~LEDN may be connected in parallel to power input terminals, respectively, to which rectified power Vo is input from the power supply unit 110. Among the plurality of LED units LED1~LEDN, a termination end of the LED unit in a front end may be electrically connected to a middle of the LED unit adjacent to the LED unit in the front end.

More specifically, a termination end of the first LED unit LED1 may be electrically connected to a middle of the second LED unit LED2 adjacent to the first LED unit LED1. Likewise, a termination end of the second LED unit LED2 may be electrically connected to a middle of the third LED unit LED3. Such connections may be repeatedly performed up to the Nth LED unit LEDN.

In this regard, among the plurality of LED units LED1~LEDN, the number of LEDs of the LED unit in the front end may be identical to the number of LEDs from an initial end of the LED unit adjacent thereto to the middle thereof.

That is, more specifically, the termination end of the first LED unit LED1 may be electrically connected to the middle of the second LED unit LED2 adjacent to the first LED unit LED1, and the number of LEDs of the first LED unit LED1 is 2, identical to the number of LEDs, two, from the initial end of the second LED unit LED2 to the middle thereof.

Likewise, the termination end of the second LED unit LED2 may be electrically connected to the middle of the third LED unit LED3, and the number of LEDs of the second LED unit LED2 is 3 that may be identical to 3 that is the number of LEDs from an initial end of the third LED unit LED3 to the middle.

The number of LEDs as described above may be applied up to the Nth LED unit LEDN.

The current source unit 130 may include a plurality of current sources I1~IN. The plurality of current sources I1~IN may correspond to the plurality of LED units LED1~LEDN, respectively, and may be electrically connected to termination ends of corresponding LED units.

More specifically, the first current source I1 may be electrically connected between the termination end of the first LED unit LED1 and a ground, the second current source 12 may be electrically connected between the termination end of the second LED unit LED2 and the ground, and the third current source I3 may be electrically connected between the termination end of the third LED unit LED3 and the ground. Likewise, the Nth current source IN may be electrically connected between a termination end of the Nth LED unit LEDN and the ground.

As described above, the plurality of connected current sources I1~IN may allow an appropriate amount of current to flow in such a manner that an LED of a corresponding LED unit may emit light.

The control unit 140 may control each of the plurality of current sources I1~IN of the current source unit 130 to switch an operation on/off. The above-described switching on/off control may be performed according to the voltage level of the rectified power Vo.

Figure 2:
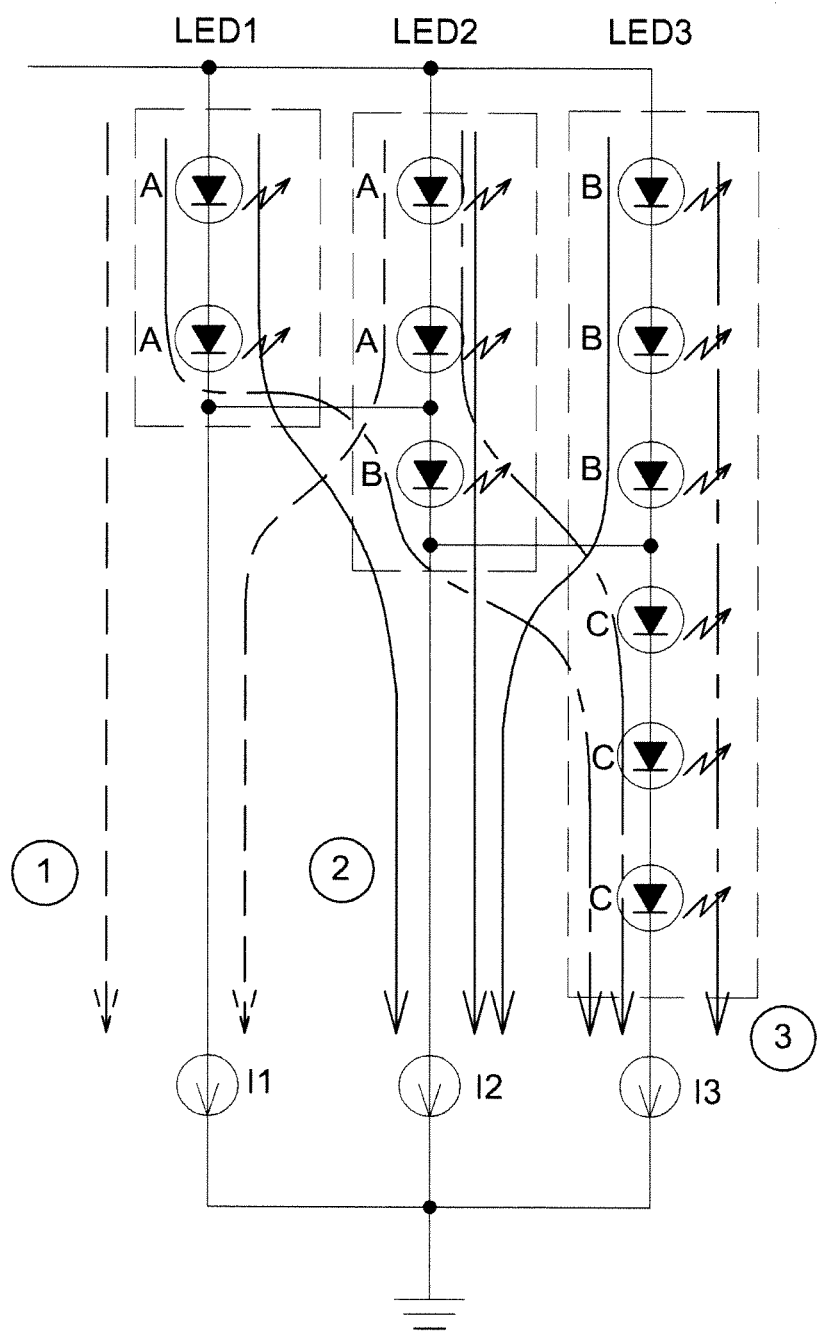
FIG. 2 is a diagram of current flow of an apparatus for driving an LED according to an embodiment of the present invention.

FIG. 2 is a diagram of current flow of an apparatus for driving an LED according to an embodiment of the present invention.

Referring to FIG. 2, although the first through third LED units LED1, LED1, and LED3 and the first through third current sources I1, I2, and I3 are shown, this is merely an embodiment, and the present invention is not limited thereto.

FIG. 2 shows the current flow of the apparatus for driving the LED according to an embodiment of the present invention. As shown in FIG. 2, an LED of a single LED unit per current source does not emit light but the current flow is distributed so that current flows through LEDs of a plurality of LED units and thus LEDs emit light.

Figure 3:
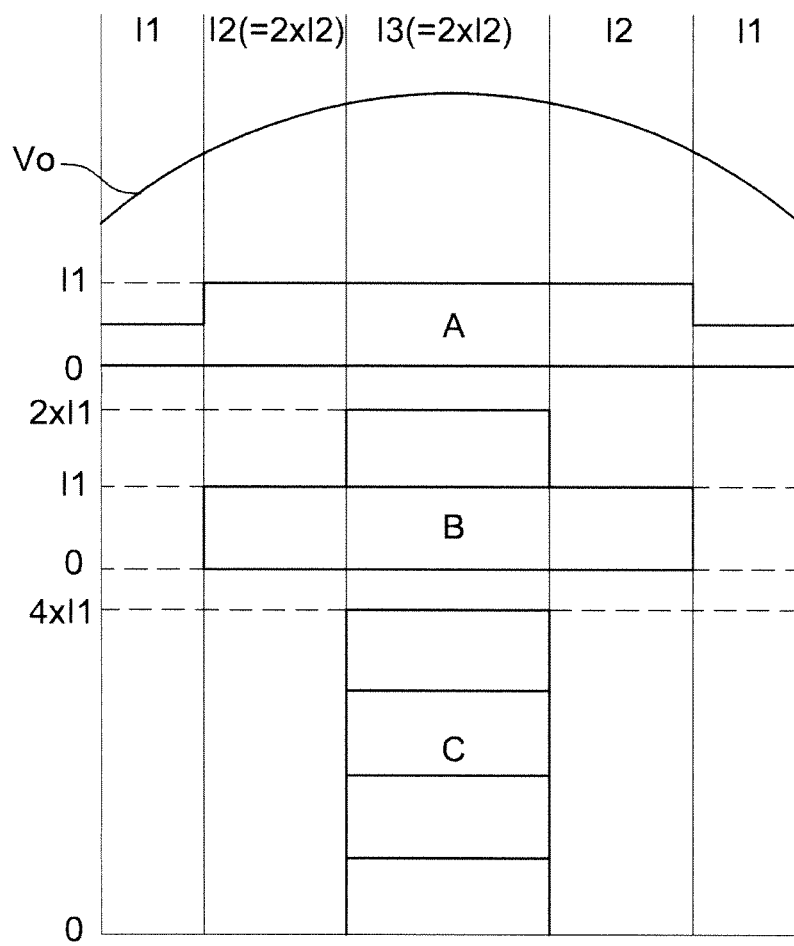
FIG. 3 is a graph of current stress of an apparatus for driving an LED according to an embodiment of the present invention.

FIG. 3 is a graph of current stress of an apparatus for driving an LED according to an embodiment of the present invention.

Referring to FIGS. 2 and 3, for example, when the voltage level of the rectified power Vo is a voltage level to the extent that an LED A of the first LED unit LED1 may be conductive, the first current source I1 may be switched on so that corresponding current may flow, and accordingly, the LED A of the first LED unit LED1 may be conductive and may emit light. In this regard, a termination end of the first LED unit LED1 may be connected to a middle of the second LED unit LED2, and the LED A from an initial end to a middle of the second LED unit LED2 may also be conductive and emit light along with the conductivity of the LED A of the first LED unit LED1 (please see reference numeral ①).

Likewise, when the voltage level of the rectified power Vo is a voltage level to the extent that the LED of the second LED unit LED2 may be conductive, the first current source I1 may be switched off and the second current source I2 may be switched on so that corresponding current may flow, and accordingly, the LED A and the LED B of the second LED unit LED2 may be conductive and emit light. In this regard, a termination end of the second LED unit LED2 may be connected to a middle of the third LED unit LED3, and LEDs B from an initial end to the middle of the third LED unit LED3 may be conductive and emit light along with the conductivity of the LED A of the second LED unit LED2. Also, the LED A of the first LED unit LED1 in which a current path is formed may be conductive and emit light (please see reference numeral ②).

Next, when the voltage level of the rectified power Vo is a voltage level to the extent that the LED of the third LED unit LED3 may be conductive, the second current source I2 may be switched off and the third current source I3 may be switched on so that corresponding current may flow, and accordingly, the LED B and an LED C of the third LED unit LED3 may be conductive and emit light. In this regard, the LED A of the first LED unit LED1 and the LEDs A and B of the second LED unit LED2, in which a current path is formed, may be conductive and emit light (please see reference numeral ③).

In view of the current stress applied to an LED, although the LED A of the first LED unit LED1 and the LEDs A from the initial end and the middle of the second LED unit LED2 may be conductive at the entire voltage level of the rectified power Vo, the current stress may be regarded as being relatively small. To the contrary, although a large amount of the current stress may be applied to the LED C of the third LED unit LED3 that emits light at the maximum voltage level of the rectified power Vo, an application period is relatively short, and thus, average current stress may be relatively small.

Figure 4:
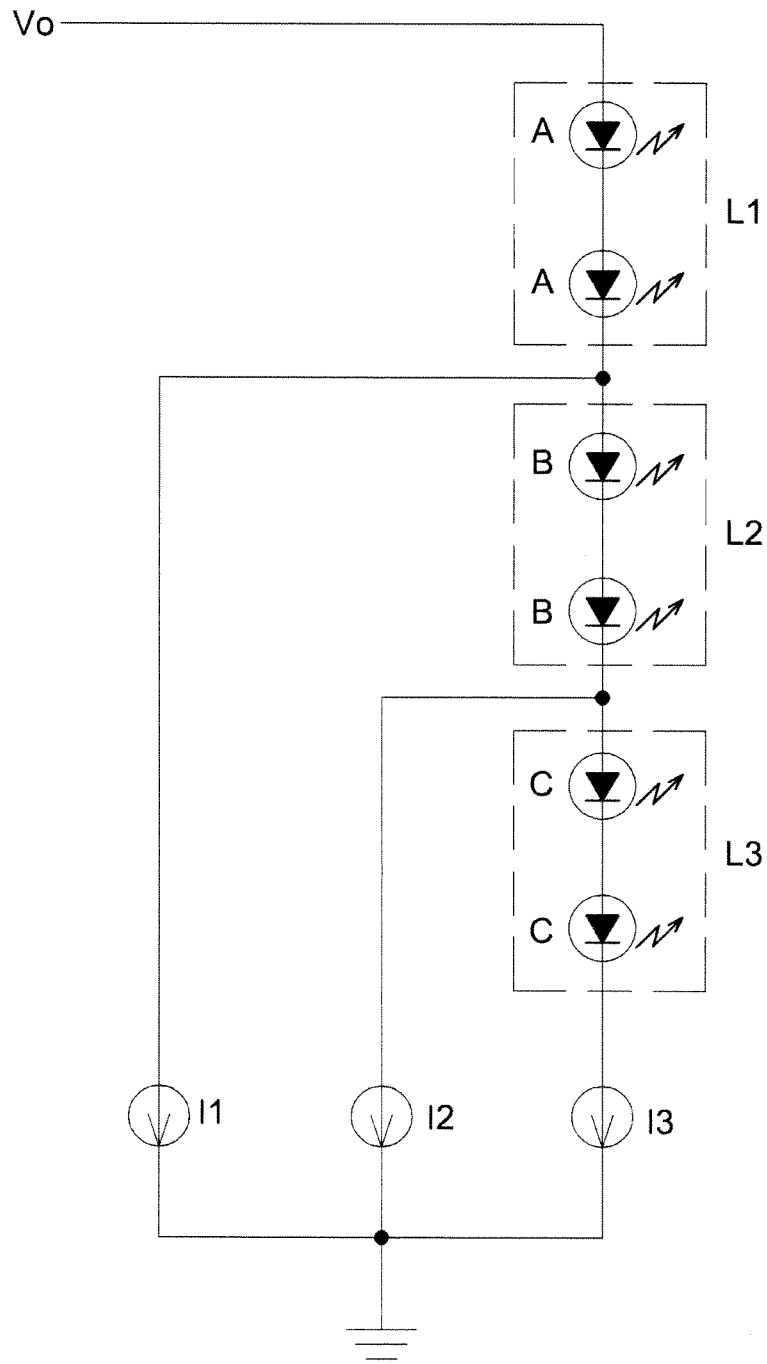
FIGS. 4 and 5 are diagrams of current flow and current stress of an apparatus for driving an LED according to the related art.
Figure 5:
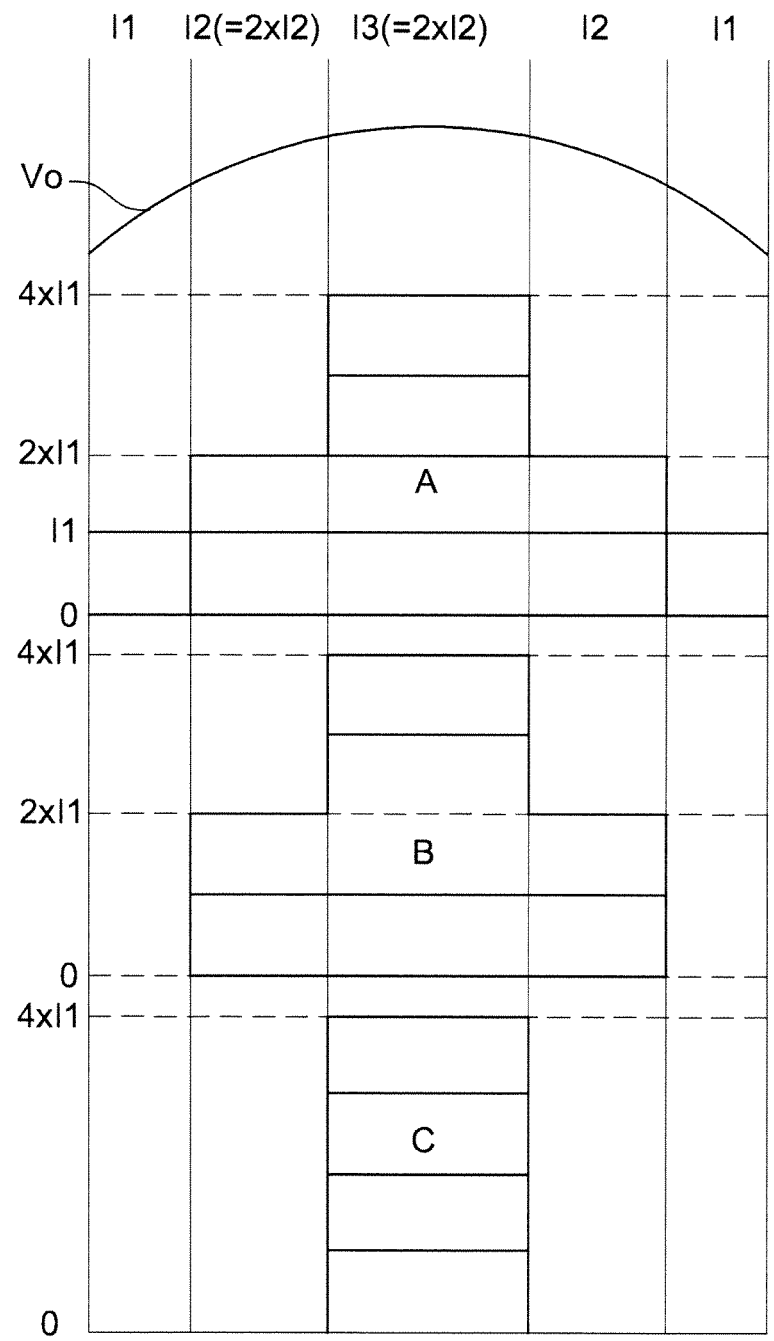

FIGS. 4 and 5 are diagrams of current flow and current stress of an apparatus for driving an LED according to the related art.

As shown in FIG. 4, a plurality of LEDs of the apparatus for driving the LED are connected in series to each other according to the related art, and switches for controlling the current flow are connected to a middle so that first through third LED groups L1, L2, and L3 are conductive and emit light according to a voltage level of rectified power. As shown in FIG. 5, the LED A of the first LED group L1 is conductive at an entire voltage level of the rectified power so that current stress of the LED A of the first LED group L1 is more intense than that of the LEDs B and C of the second and third LED groups L2 and L3. Likewise, the current stress of the LED B of the second LED group LED2 is more intense than that of the LED C of the third LED group L3.

To the contrary, in the apparatus for driving the LED according to an embodiment of the present invention shown in FIGS. 2 and 3, a current path may be distributed and thus current stress applied to an LED that is conductive according to the voltage level of the rectified power may be distributed.

As set forth above, according to embodiments of the invention, in connective relationships between LED groups having LED arrays, current that flows when an LED emits light may be distributed according to a voltage level of rectified power by connecting a termination end of an LED group in a front end to a middle of an LED group adjacent thereto and allowing the number of LEDs of the LED group in the front end to be identical to the number of LEDs from an initial end of the LED group adjacent thereto to a middle thereof, thereby distributing current stress applied to the LED.

While the present invention has been shown and described in connection with the embodiments, it will be apparent to those skilled in the art that modifications and variations can be made without departing from the spirit and scope of the invention as defined by the appended claims.

What is claimed is:

1. An apparatus for driving a light emitting diode (LED), the apparatus comprising:
    an LED part including a plurality of LED units respectively including at least one LED, the plurality of LED units being connected in parallel to a power input terminal to which rectified power in sine wave form is supplied, and, among the plurality of LED units connected in parallel, a termination end of the LED unit in a front end being connected to a middle of an adjacent LED unit; and
    a current source unit including a plurality of current sources respectively connected to termination ends of the plurality of LED units and allowing corresponding current to flow through the plurality of LED units.

2. The apparatus of claim 1, wherein the number of LEDs included in respective LED units among the plurality of LED units varies.

3. The apparatus of claim 2, wherein, among the plurality of LED units, the number of LEDs included in the LED unit in the front end is smaller than the number of LEDs included in an adjacent LED unit.

4. The apparatus of claim 3, wherein, among the plurality of LED units, the number of LEDs included in the LED unit in the front end is identical to the number of LEDs from an initial end of the adjacent LED unit to a middle of the adjacent LED unit connected to a termination end thereof among all LEDs of the adjacent LED unit.

5. The apparatus of claim 1, wherein the plurality of respective current sources allow current to flow therefrom such that an LED of a corresponding LED unit is conducted.

6. The apparatus of claim 5, wherein the current flowing by the plurality of current sources is distributed by at least a portion of the LEDs of at least two of the plurality of LED units.

7. An apparatus for driving an LED, the apparatus comprising:
    a power supply unit rectifying and supplying alternating current (AC) power;
    an LED part including a plurality of LED units receiving the rectified power from the power supply unit and emitting light, each of the plurality of LED units including at least one LED, and, among the plurality of LED units, a termination end of the LED unit in a front end being connected to a middle of an adjacent LED unit;

a current source unit including a plurality of current sources respectively connected to termination ends of the plurality of LED units and allowing corresponding current to flow through the plurality of LED units; and a control unit controlling current switching the plurality of current sources of the current source unit according to a voltage level of the rectified power supplied from the power supply unit.

8. The apparatus of claim 7, wherein the plurality of LED units is connected in parallel to power input terminals, respectively, to which the rectified power is supplied from the power supply unit.

9. The apparatus of claim 8, wherein the number of LEDs included in respective LED units among the plurality of LED units varies.

10. The apparatus of claim 9, wherein, among the plurality of LED units, the number of LEDs included in the LED unit in the front end is smaller than the number of LEDs included in an adjacent LED unit.

11. The apparatus of claim 10, wherein, among the plurality of LED units, the number of LEDs included in the LED unit in the front end is identical to the number of LEDs from an initial end of the adjacent LED unit to a middle of the adjacent LED unit connected to a termination end thereof among all LEDs of the adjacent LED unit.

12. The apparatus of claim 7, wherein the plurality of respective current sources allow current to flow therefrom such that an LED of a corresponding LED unit is conducted thereby.

13. The apparatus of claim 12, wherein the current flowing by the plurality of current sources is distributed by at least a portion of the LEDs of at least two of the plurality of LED units.

* * * * *